(12) United States Patent
Zumach et al.

(10) Patent No.: US 9,542,414 B1
(45) Date of Patent: Jan. 10, 2017

(54) LOCK STATE RECONSTRUCTION FOR NON-DISRUPTIVE PERSISTENT OPERATION

(71) Applicant: NetApp, Inc., Sunnyvale, CA (US)

(72) Inventors: William Zumach, Pittsburgh, PA (US); Omprakaash Thoppai, Seven Fields, PA (US); Wesley R. Witte, Campbell, CA (US); Raghavendra C. Maddipatla, Sunnyvale, CA (US); Saji Vijaya Rajendran, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 13/739,872

(22) Filed: Jan. 11, 2013

(51) Int. Cl.
    *G06F 15/173* (2006.01)
    *G06F 17/30* (2006.01)
    *H04L 12/24* (2006.01)

(52) U.S. Cl.
    CPC ..... *G06F 17/30171* (2013.01); *H04L 41/0654* (2013.01)

(58) Field of Classification Search
    USPC ................................................ 709/225, 210
    See application file for complete search history.

(56) References Cited

U.S. PATENT DOCUMENTS

| | | | | |
|---|---|---|---|---|
| 7,587,558 B1* | 9/2009 | Smith | ................... | G06F 3/0622 711/114 |
| 7,640,582 B2* | 12/2009 | Beck | ..................... | H04L 63/12 707/999.001 |
| 7,844,584 B1* | 11/2010 | Griess | ............... | G06F 17/30171 707/668 |
| 2008/0077635 A1* | 3/2008 | Sporny | ............. | G06F 17/30206 |
| 2011/0145627 A1* | 6/2011 | Huras | ..................... | G06F 9/526 714/3 |

* cited by examiner

*Primary Examiner* — Vivek Srivastava
*Assistant Examiner* — Hermon Asres
(74) *Attorney, Agent, or Firm* — Nixon Peabody LLP; Khaled Shami

(57) ABSTRACT

Techniques for notifying clients whose locks did not persist about a loss of lock state after a failover event are disclosed herein. According to one embodiment, a storage node of a high availability cluster constructs a lock data structure based on a mirrored lock data structure for a lock on a data container. The storage node receives a data operation request permitted by the lock from a client to operate on the data container. The storage node instructs to terminate a connection with the client if the lock data structure for the lock on the data container has been recently reconstructed. Accordingly, the client revokes the connection and refrains from committing the locally cached operations to the data container stored in the storage node. The client has an option to reconnect with the cluster and regain the data container privilege controlled by the lock.

14 Claims, 8 Drawing Sheets

LOCK STATE RECONSTRUCTION FOR NON-DISRUPTIVE PERSISTENT OPERATION

FIELD OF THE INVENTION

At least one embodiment of the present invention pertains to network storage systems, and more particularly, to a network storage system that provides a data container locking mechanism.

BACKGROUND

A storage system typically comprises one or more storage devices in which information can be stored and from which information can be retrieved. A network storage system can be implemented in accordance with any of a variety of storage architectures and techniques including, but not limited to, a network-attached storage (NAS) environment or a storage area network (SAN).

A storage system typically includes a storage operating system that implements a high-level data organization module, sometimes called a file system, to logically organize stored data in hierarchical structures of logical containers. The logical containers can be or include, for example, volumes, files and/or logical units. A volume is a logical data set which is an abstraction of physical storage, combining one or more physical mass storage devices (e.g., disks) or parts thereof into a single logical storage object. Volumes can be further organized into aggregates. An aggregate is a logical container for a pool of storage, combining one or more physical mass storage devices (e.g., disks) or parts thereof into a single logical storage object, which contains or provides storage for one or more other logical data sets at a higher level of abstraction (e.g., volumes). Each logical container can be configured to store data in smaller units, often called blocks. Each block contains information, which may include the actual data of the file and/or metadata. The blocks of one or more files can be organized within one or more volumes that are maintained by the file system.

A network storage system can be configured to operate according to a client-server model of information delivery, to allow clients to store and access data in the system via a network. In this model, the client can have an application, such as a database application, executing in a computer that communicates with the storage system. Each client may send input/output (I/O) requests to read and write the data containers.

Two or more storage systems may be interconnected as nodes in a storage cluster to service client requests. Clustered storage systems can provide redundancy for the data stored in the systems, so that if one node becomes unavailable, then another node in the cluster takes over the storage space managed by the unavailable node to provide uninterrupted data service to the client. For example, a high-availability (HA) cluster can harness storage servers in pairs, groups or clusters to provide continued service when one or more of the system components fail. An HA cluster can detect hardware or software faults in one of its nodes and immediately cause another node to takeover the service from the at-fault node without requiring administrative intervention; this is a process known as failover.

In such an environment, managing access rights associated with input/output (I/O) operations (reads and writes) is a challenge. Access rights may be managed by issuing locks to one or more client applications (each of which can be referred to as "a client"), on a data container or a set of data residing at a storage volume. A lock provides certain rights to the entity (e.g. a client) which owns the lock, to perform read and write operations with respect to the data or the data container. The lock prevents the interceding update scenario in which more than one entity attempts to access the same data simultaneously. Continuous efforts are being made to better manage locks in networked storage systems without interrupting clients' data requests.

For example, nodes within a networked storage cluster can store information of the locks in a shared memory that multiple nodes can access. When a first node fails, a second node can takeover storage of the first node and retrieve information of the locks for the storage from the shared memory. Thus, the second node can continue to service data requests for the taken-over storage and maintain access rights of the taken-over storage controlled by the locks. However, shared memory architectures are costly and require special hardware to implement. When a client owns a lock as an exclusive right to read or write data, the client may cache I/O operations such as writes in a local cache first. Then the client may commit the cached operations to the data container in a batch for performance reasons. Events including takeover, giveback, and aggregate relocation are storage level events. There is no provision in protocol to communicate that information regarding the events to clients. For instance, when events such as takeover occur, the client may not receive the notification about the takeover and may continue to accumulate operations in the local cache.

SUMMARY

Techniques introduced here provide a mechanism for notifying clients whose locks did not persist about a loss of lock state after a failover event, since only a subset of locks on a file is mirrored. The techniques further proactively notify clients whose locks were mirrored that a failover event occurs and prompt the clients to reconnect as soon as possible. According to the techniques, a storage node of a high availability cluster constructs a lock data structure based on a mirrored lock data structure for a lock on a data container. The storage node receives a data operation request permitted by the lock from a client to operate on the data container. The storage node terminates a connection with the client if the lock data structure for the lock on the data container has been recently reconstructed. Upon receiving the instruction, the client revokes the connection with the cluster and refrains from committing the locally cached operations to the data container stored in the storage node. The client has an option to reconnect with the cluster and regain the data container privilege controlled by the lock.

According to one embodiment, mechanisms for preventing inconsistent data container operations on a data storage node of a high-availability cluster are disclosed herein. After reconstructing the lock data structures, the data storage node sets flags on the reconstructed lock data structures. When the node receives a data container operation permitted by a lock from a client, the node checks whether there is a flag set on the lock data structure for the lock. If there is no flag set, the node proceeds to execute the data container operation. If a flag is set, the node instructs the client to close the connection between the client and the cluster. In some embodiments, the instruction is relayed by another storage node. Upon receiving the instruction, the client revokes the connection and refrains from committing the locally cached operations to the data container stored in the storage node. The client has an option to reconnect with the cluster and regain the data container privilege controlled by the lock. The node removes the flag set on the lock data structure when it receives the reconnect request from the client. The mechanism ensures that a client needs to reconnect with the cluster to commit any new data container operation under a lock once the lock has been reconstructed.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

For various reasons, a storage cluster can move control of storage between nodes within the cluster. For instance, during events such as takeover and aggregate migration (which are discussed in detail below), lock data structures are mirrored from a first node to its partner node. Lock data structures are data structures for managing locks and contain metadata for the locks. The mirrored lock data structures can be used to reconstruct original lock data structures on the partner node. Typically only a subset of locks on a file is mirrored. Since failover events are storage level events, client may be notified about the event. For example, if a node responsible for data storage failed or otherwise became unavailable before notifying the client, the client may not know the information about the storage node unavailable. Techniques disclosed herein provide a mechanism for notifying clients whose locks did not persist about a loss of lock state after a failover event, and proactively prompting the clients to reconnect as soon as possible.

Figure 1:
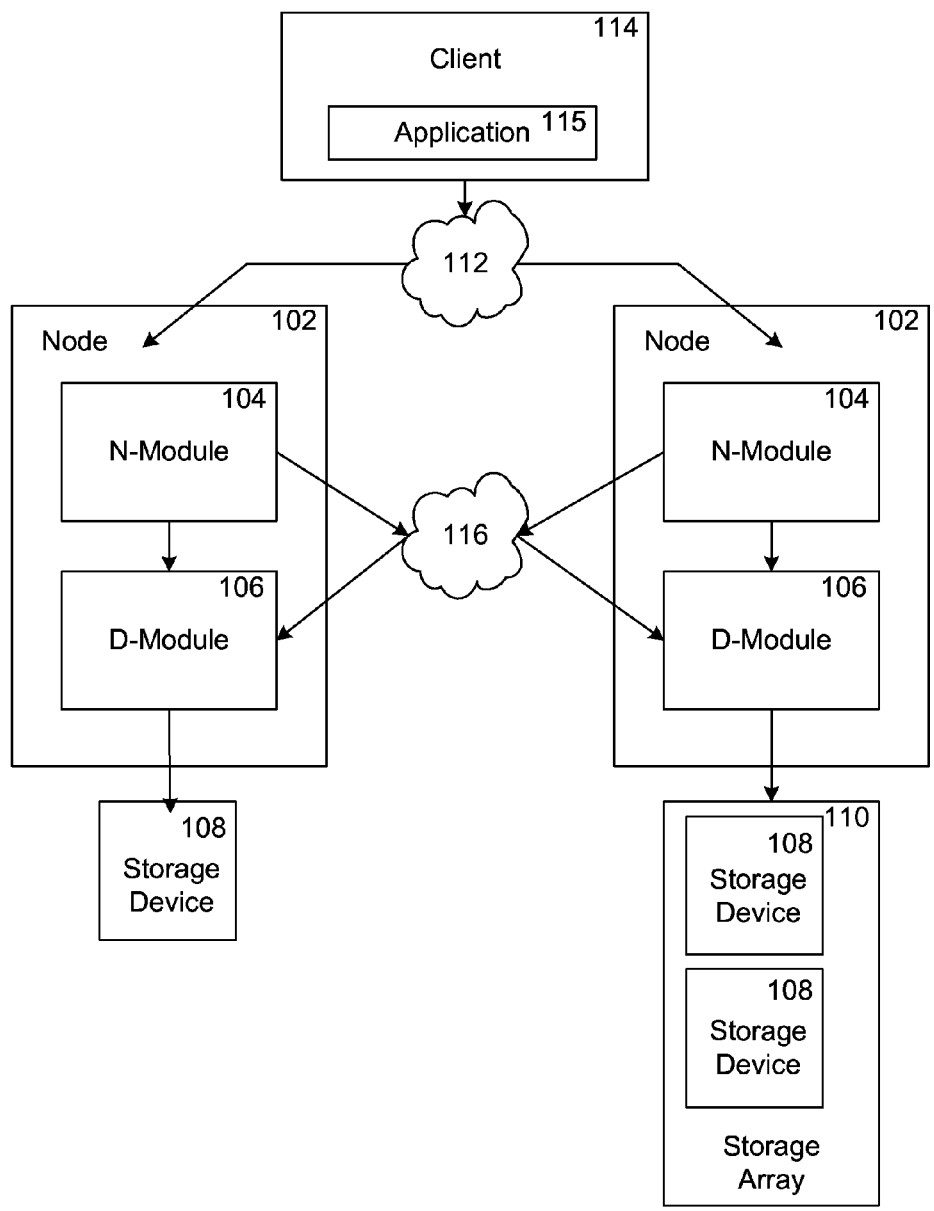
FIG. 1 is a schematic block diagram showing a plurality of storage system nodes interconnected as a storage cluster for servicing data requests.

FIG. 1 is a schematic block diagram showing multiple storage system nodes 102 interconnected as a storage cluster 100. The storage system nodes 102 are configured to provide storage services for one or more clients 114 in relation to data organized at storage devices managed by the nodes 102. At least one client computing system (which may be referred to as "a client") 114 interfaces with one or more of the nodes 102 for reading or writing data stored at the storage devices.

Nodes 102 can include various components that cooperate to provide distributed storage system architecture of cluster 100. In one embodiment, each node 102 includes a network element (N-module 104) and a storage device element (D-module 106). Each N-module 104 includes functionality that enables node 102 to connect to client computing systems 114 over a network connection 112, while each D-module 106 connects to, and provides the functionality for managing and accessing, one or more storage devices, such as a storage device 108 or a storage array 110. Illustratively, network 112 can be embodied as an Ethernet network, a Fibre Channel (FC) network or any other network type. Nodes 102 can be interconnected by a cluster switching fabric 116 which may be embodied as a Gigabit Ethernet switch, for example.

FIG. 1 shows an equal number of N-modules and D-modules in the cluster 100; however, a cluster can include different numbers of N-modules and D-modules. For example, there may be numbers of N-modules and D-modules interconnected in a cluster that do not reflect a one-to-one correspondence between the N-modules and D-modules.

Each client 114 can be, for example, a general purpose computer having components that may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in a main memory at execution time. Typically, the main memory is composed of random access memory (RAM) circuits. A computer system with a CPU and a main memory is often referred to as a host system.

Clients 114 can be configured to interact with a node 102 in accordance with a client/server model of information delivery. For example, each client 114 can request the services of a node 102 (e.g., read or write services), and the node 102 can return the results of the services requested by the client 114 over network 112.

Clients 114 can be configured to execute software and/or firmware instructions (hereinafter collectively called "software"), shown as application 115 for reading and writing data stored in storage devices 108. Application 115 can be, for example, a database application, a financial management system, an electronic mail application or any other application type.

Client 114 can issue packets using application 115 according to file-based access protocols, such as the Common Internet File System ("CIFS") protocol or the Network File System ("NFS") protocol, over the Transmission Control Protocol/Internet Protocol ("TCP/IP") when accessing data in the form of certain data containers, such as files. Alternatively, the client 114 can issue packets using application 115 including block-based access protocols, such as the Small Computer Systems Interface ("SCSI") protocol encapsulated over TCP ("iSCSI") and SCSI encapsulated over Fibre Channel ("FCP"), when accessing data in the form of other data containers, such as blocks.

Figure 2:
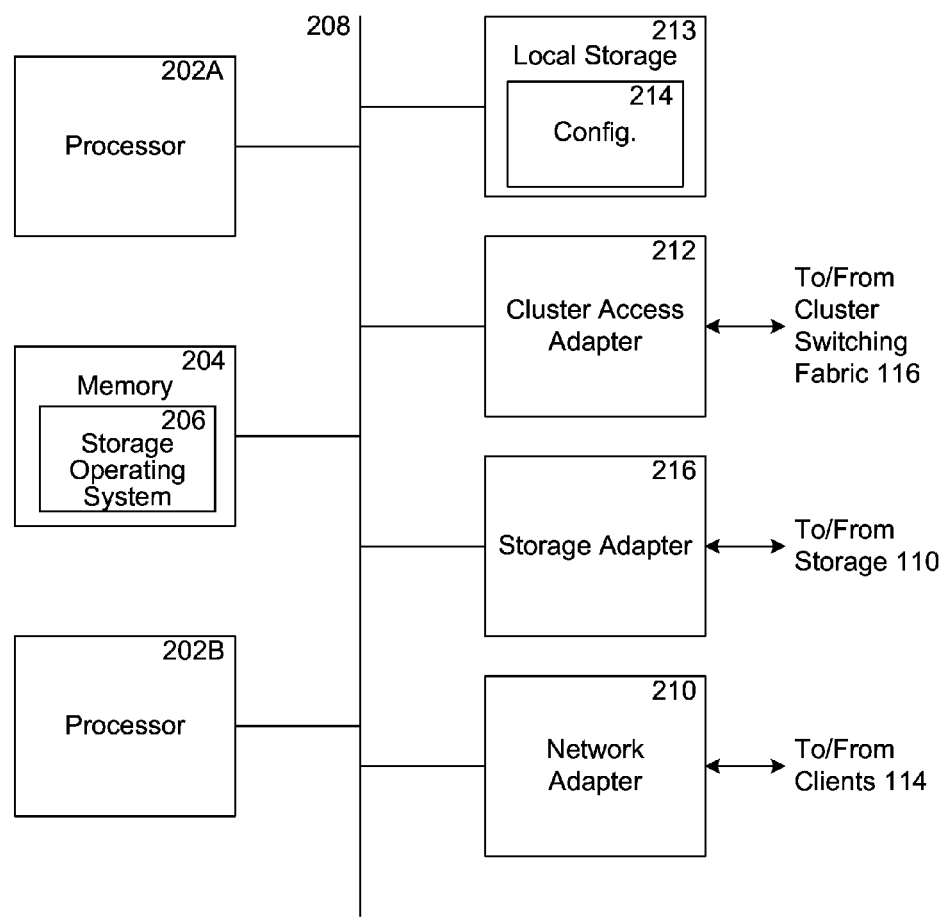
FIG. 2 is a high-level block diagram showing an example of the architecture of a node, which can represent any of the high-availability cluster nodes.

FIG. 2 is a high-level block diagram showing an example of the architecture of a node 102, which can represent any of the high-availability cluster nodes. The node 102 includes multiple processors 202A and 202B, a memory 204, a network adapter 210, a cluster access adapter 212, a storage adapter 216 and local storage 213 interconnected by an interconnect system (also referred to as bus) 208. The local storage 213 comprises one or more physical storage devices, such as disks, non-volatile storage devices, flash drives, video tape, optical, DVD, magnetic tape, electronic random access memory, micro-electro mechanical and any other similar media adapted to store information. The local storage 213 can also be utilized by the node to locally store configuration information (e.g., in a configuration data structure 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. In other embodiments, a node can include a single processor, instead of multiple processors. The bus system 208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 can comprise one or more ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments, where the N-modules and D-modules are implemented on separate storage systems or computers, the cluster access adapter 212 is utilized by the N-module or D-module for communicating with other N-module and/or D-modules in the cluster 100.

The network adapter 210 can further comprise one or more ports adapted to couple the node 102 to one or more clients 114 over point-to-point links, wide area networks, virtual private networks implemented over a public network (e.g. Internet) or a shared local area network. The network adapter 210 thus can comprise the mechanical, electrical and signaling circuitry needed to connect the node to the network.

The storage adapter 216 cooperates with a storage operating system 206 executing on the node 102 to access data requested by the clients. The data can be stored on any type of attached storage device media such as video tape, optical, DVD, magnetic tape, bubble memory, electronic random access memory, micro-electro mechanical and any other similar media adapted to store information, including data and parity information. For example, as illustrated in FIG. 1, the data can be stored in the storage devices 108 of array 110, which may be a redundant array of inexpensive devices (RAID) array, for example. The storage adapter 216 can include a plurality of ports having input/output (I/O) interface circuitry that couples to the storage devices over an I/O interconnect arrangement, such as a conventional high-performance, Fibre Channel (FC) link topology.

Although various adapters (210, 212 and 216) have been shown as separate hardware based components, the embodiments disclosed herein are not limited to those elements being separate components. For example, the embodiments disclosed herein may be implemented using a converged network adapter (CNA) that is capable of handling both network and storage protocols, for example, a Fibre Channel over Ethernet (FCoE) adapter.

Each node 102 is illustratively embodied as a multiple-processor system executing the storage operating system 206. The operating system 206 can run on the processors as a high-level data organization module, that includes a file system to logically organize the data as a hierarchical structure of volumes, directories, files (possibly including special types of files called virtual disks), and data blocks (hereinafter generally called "blocks") on storage devices 108. However, it will be apparent to those of ordinary skill in the art that the node 102 can alternatively comprise a single processor or more than two processors. In one embodiment, one processor 202A executes the functions of the N-module 104 on the node, while the other processor 202B executes the functions of the D-module 106.

The memory 204 can include storage locations that are addressable by the processors and adapters for storing programmable instructions and data structures. The processor and adapters can, in turn, include processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

An example of operating system 206 is the DATA ONTAP® operating system available from NetApp, Inc. which may implement the Write Anywhere File Layout (WAFL®) file system. However, any appropriate storage operating system can be enhanced for use in accordance with the inventive principles described herein.

Storage of data on each storage array 110 is preferably implemented as one or more storage "volumes" that comprise a collection of physical storage devices 108. Each logical volume is generally, although not necessarily, associated with its own file system. The storage devices 108 within a logical volume/file system are typically organized as one or more groups, wherein each group may be operated as a RAID group.

Each node maintains a lock data structure for managing locks that are granted to a client 114 for accessing a piece of data or a data container managed by a node. The term "lock" as used herein means a mechanism used by a node 102 to control access to a data container. There are various "rights" associated with the locks that can be issued or revoked with respect to a data container. The term "rights" as used herein means a privilege that is granted to an entity, such as a client application executed at a computing device, with respect to any input/output (I/O) operation, including read and write operations. The term "data container" as used throughout this specification means a logical container of data, such as a file, a logical unit identified by a logical unit number (LUN), a data block or any other unit for organizing data.

The storage operating system 206, at least a portion of which is typically resident in the memory of the node 102, invokes storage operations in support of the storage service implemented by the node 102, and maintains a lock data structure for managing various lock types that are issued to client applications. The lock data structure may include various metadata fields that can be used to reconstruct a lock. The various lock types are utilized in responding to client 114 requests for reading, writing, or modifying a data container. The following provides a brief description of the various lock types that may be used by storage operating system 206 for managing access to data containers.

In one embodiment the following types of locks may be used by the system: Opportunistic Lock, Shared Lock, Byte Lock and Persistent Open.

An "Opportunistic Lock" ("OpLock") is a lock that is placed by one or more clients on a data container residing in a storage volume. States of variables that represent an OpLock can be embedded in a data container attribute (e.g., metadata) for the data container. OpLock, based on client requests, coordinates data caching and coherency between clients and storage systems. Coherency or coherent data in this context means that all instances of any item of data are the same across a network, i.e. data stored by the storage system and locally by the clients is synchronized. OpLocks are defined by the CIFS protocol and there are different types of OpLocks, for example, Level 1, Level 2 and other types. The rights associated with an OpLock depend on the OpLock type.

A "Shared Lock" is typically granted to a client application (115) by storage operating system 206. The Shared Lock allows more than one application 115 to access a data container.

"Byte lock" is a lock type that limits access to a portion of a data container. A client can request to open a data container and request a lock for a byte range of the data container.

"Persistent Open" is a feature that may be used for various locks issued by storage operating system 206. The Persistent Open feature provides an exclusive right of a data container. When a node 102 grants a Persistent Open Persistent Openlock of a data container to a client, it also provides a reconnect key to the client. If the node becomes unavailable for any reason, the Persistent Open Persistent Openlock stays open for a specified duration and within that duration, the client may use the reconnect key to obtain the lock and access to the data container.

To manage the various locks, the storage operating system includes a lock manager that maintains one or more lock data structures for managing the locks. Details regarding the lock manager and the lock data structures are provided below.

Figure 3:
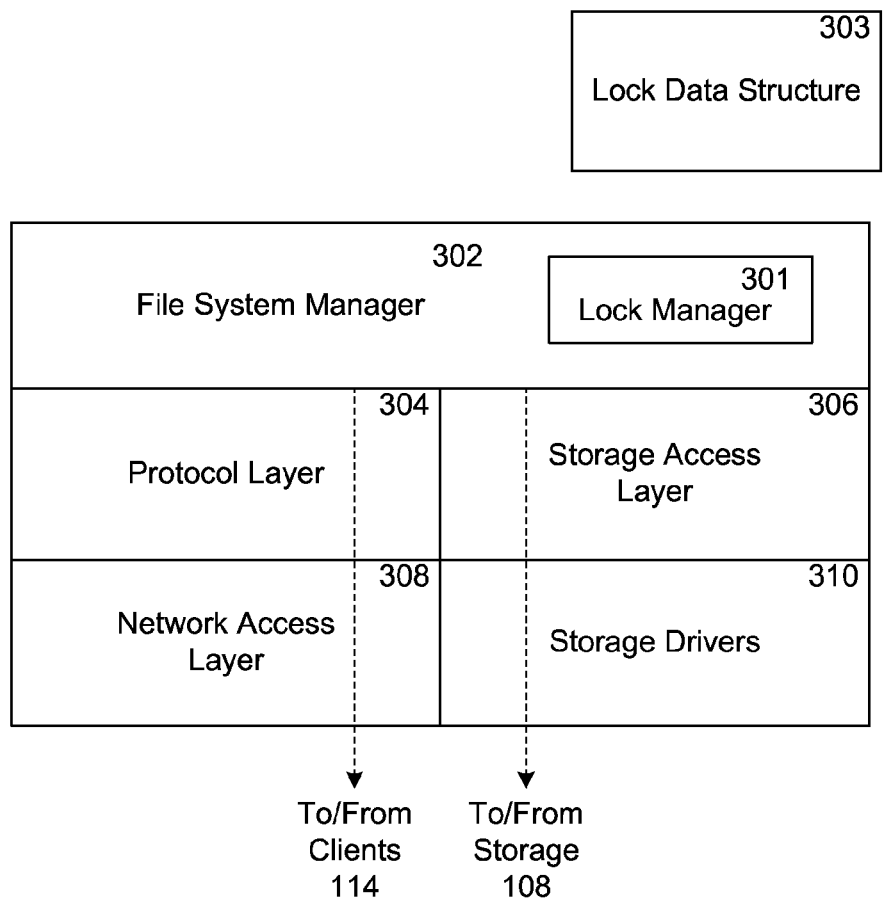
FIG. 3 illustrates an example of an operating system in a node in a high-availability cluster.

FIG. 3 illustrates an example of operating system 206 included in a node 102, according to one embodiment of the present disclosure. In one example, operating system 206 can include several modules, or "layers" executed by one or both of N-Module 104 and D-Module 106. These layers include a file system manager 302 that keeps track of a directory structure (hierarchy) of the data stored in storage devices and manages read/write operations. The operations include read and write operations on storage devices in response to requests from the client 114. File system 302 can also include a lock manager 301 that maintains one or more lock data structures 303 for managing the various locks used for limiting access to data containers stored within cluster 100.

Operating system 206 can also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 can include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 can also include a storage access layer 306 and an associated storage driver layer 310 to allow D-module 106 to communicate with one or more storage devices. The storage access layer 306 may implement a higher-level disk storage protocol, such as RAID, while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc.).

Figure 4A:
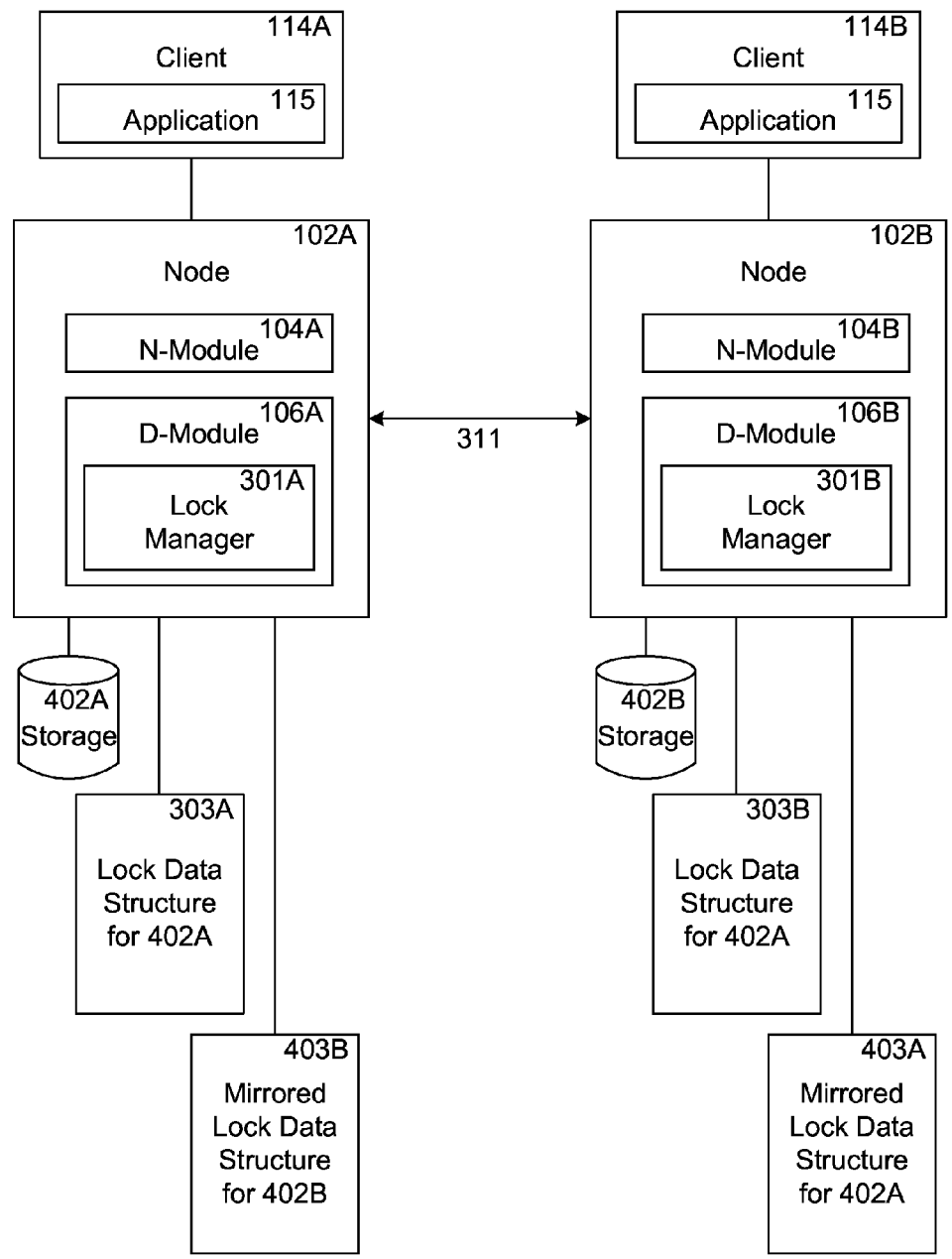
FIG. 4A shows two nodes that maintain and synchronize lock data structures and mirrored lock data structures.

As mentioned above the operating 206 system includes a lock manager 301 that maintains locks for clients for providing access to data containers. The lock manager 301 further maintains mirrored lock data structures that are used for reconstructing locks when a node in the cluster that interfaces with a client system becomes unavailable and the node that maintains the mirrored lock data structures takes over the storage space previously managed by the node that became unavailable. FIG. 4A illustrates two partner nodes that can implement the takeover process.

FIG. 4A shows two nodes 102A, 102B that communicate with each other and maintain lock data structures 303A, 303B and mirrored lock data structures 403A, 403B, according to one embodiment. Node 102A can provide storage access to client 114A and node 102B can provide storage access to client 114B. In one embodiment, nodes 102A and 102B can be partner nodes in a High-Availability pair or cluster, which means that if node 102A fails, then node 102B can takeover the storage 402A of node 102A to continue to provide data access service to client 114A, and vice versa. The process by which node 102B takes over the storage space 402A managed by node 102A may be referred to as "takeover".

When node 102A comes back online and becomes available again, then node 102B can give the control of storage 402A back to node 102A such that node 102A may provide data access service to client 114A. This process is referred to as "giveback".

The lock manager 301A for node 102A maintains a lock data structure 303A for locks on storage 402A, while the lock manager 301B for node 102B maintains its lock data structure 303B for locks on storage 402B. The lock data structures 303A and 303B are also referred to as original lock data structures. Lock data structure 303A includes information for all of the locks on storage 402A that are granted by node 102A. The lock manager 301A further maintains mirrored lock data structure 403B that includes lock state information for locks on storage 402B that are granted by node 102B to client 114B. Similarly, lock data structure 303B includes information for the local locks on storage 402B granted by node 102B. The lock manager 301B further maintains mirrored lock data structure 403A that includes lock state information for locks on storage 402A that are granted by node 102A to client 114A.

In one embodiment, a volatile memory of node 102A stores the lock data structure 303A and mirrored lock data structure 403B, and a volatile memory of node 102B stores the lock data structure 303B and mirrored lock data structure 403A.

Figure 4B:
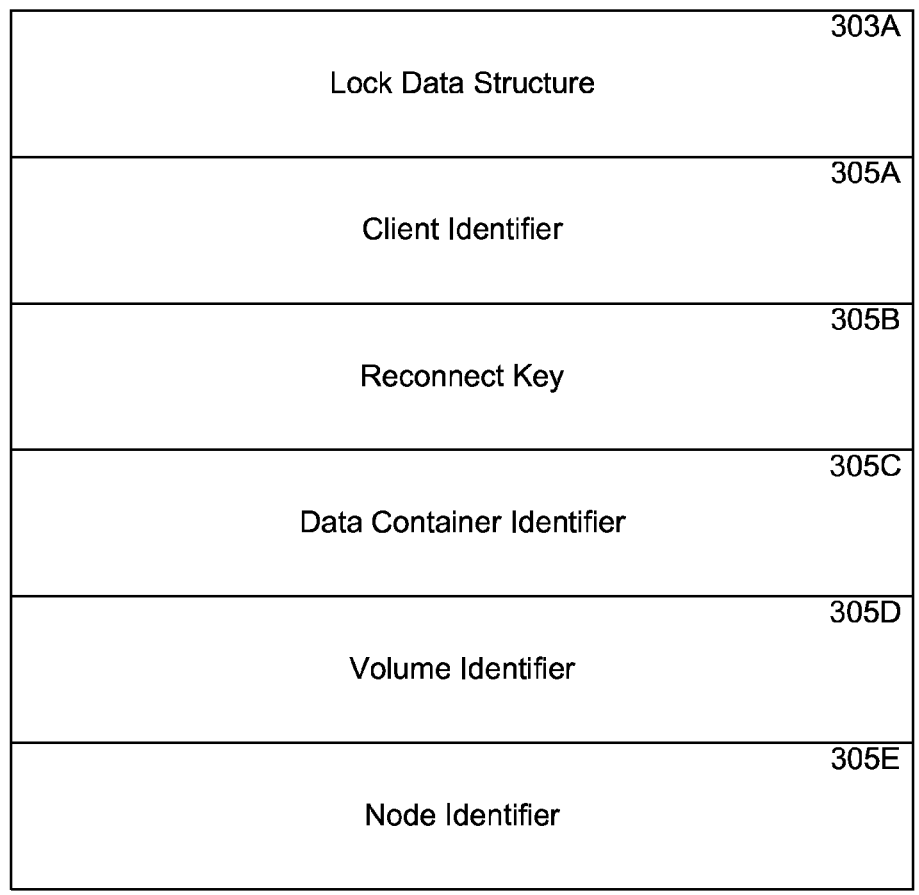
FIG. 4B illustrates fields of an example of a lock data structure.

FIG. 4B shows an original lock data structure 303A. A separate lock data structure such as this is maintained for each and every lock granted by the system. The lock data structure may include various metadata fields 305A-305F that can be used to reconstruct a lock and the values of which may be referred to individually or collectively as "lock state". A client identifier 305A identifies a client system that has been granted a lock. A reconnect key 305B is used by a client to access a lock for a Persistent Open lock type. The data container for which the lock is granted is identified by 305C. The storage volume associated with the data container is identified by 305D. The nodes that are allowed or not allowed to access the data container can be identified by node identifier 305E.

In one embodiment, a mirrored lock data structure for the original lock data structure can contain fewer fields than the original lock data structure. For example, a mirrored lock data structure can be a subset of the original lock data structure. To have a small memory footprint and to enable fast transfer, a mirrored lock data structure only stores information necessary to reconstruct a corresponding lock data structure.

Typically, the mirrored lock data structures have smaller sizes than the original lock data structures. Thus, the mirrored lock data structures take smaller memory space than the original lock data structures. In one embodiment, nodes within a storage cluster use remote procedure calls (RPCs) to transfer information related to the locks. Each RPC message can only carry a limited amount of information, it takes fewer RPC messages for the mirrored lock data structures than the original lock data structures to transfer the lock information to other nodes. However, the lock manager running on any node of the storage cluster can not recognize and operate the mirror lock data structures directly. Mirrored lock data structures are subsets of the original lock data structure that the lock manager maintains. The mirrored lock data structures can be in compressed form to save memory space and are not regularly accessed by the storage cluster. There are times when a cluster needs to reconstruct data structures for locks, based on the mirrored lock data structures stored in a memory of a node. Mirrored lock data structures contain sufficient information (metadata) for the locks to enable the lock data structure for the locks to be constructed based on the mirrored lock data structures.

For example, for non-disruption operation (NDO), node A has stored mirrored lock data structures for storage of node B (nodes A and B are partner nodes in an HA pair) before a takeover event. During the takeover event, the node A takes over storage of the node B. The node A needs to reconstruct the lock data structure for the storage taken over from node B so that the lock manager in the node A can service the lock requests for the storage.

Figure 5:
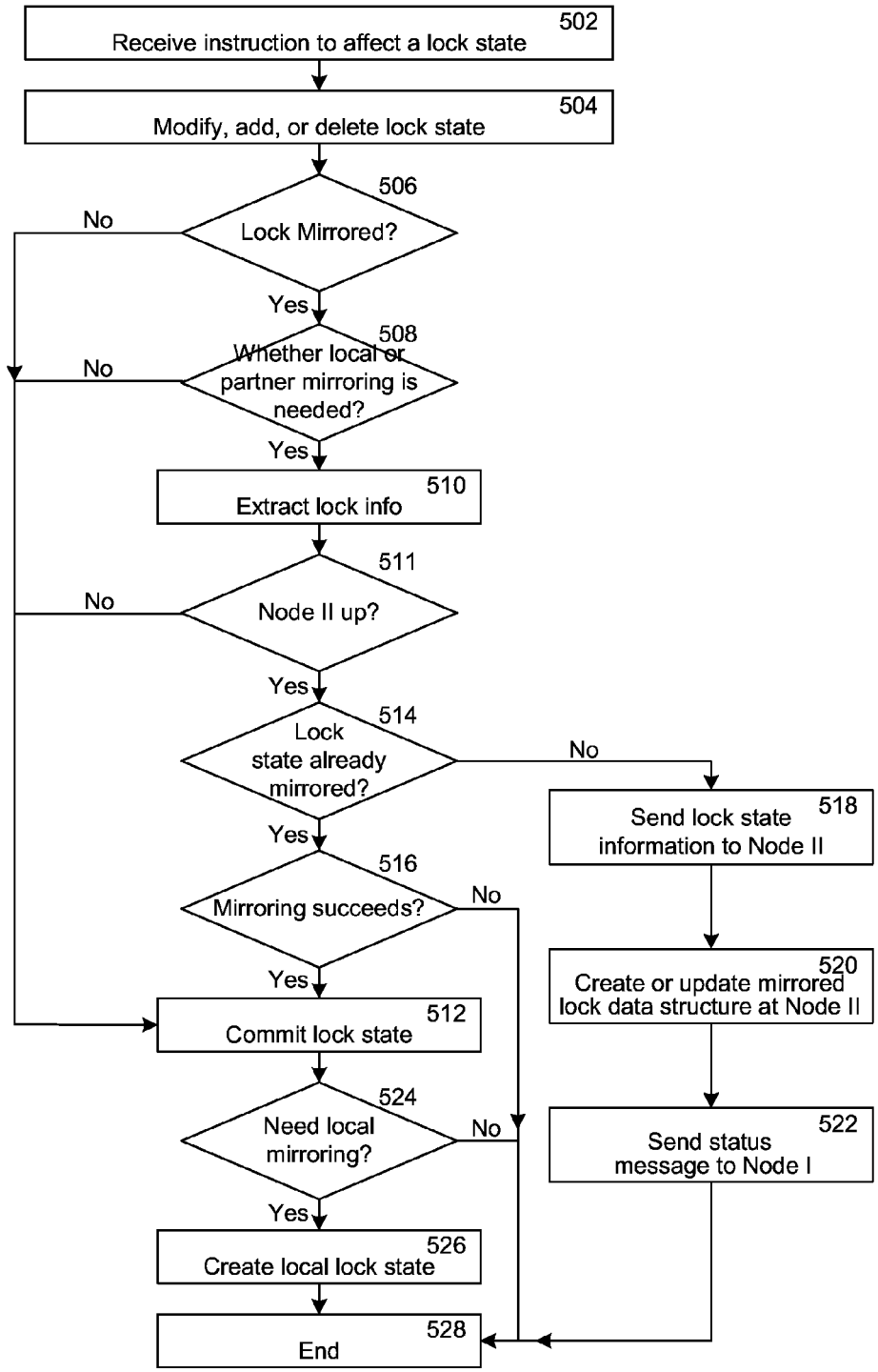
FIG. 5 shows an example of a process for updating lock state information between partner nodes in a high-availability cluster.

FIG. 5 shows a detailed process 500 for handling lock state information between partner nodes 102A (Node I) and 102B (Node II) described above with respect to FIG. 4A, according to one embodiment. The process begins at step 502, when node 102A receives an instruction to affect a lock state associated with a data container. For example, node 102A can receive a client request to open a data container on storage 402A for a read or write operation in a persistent fashion.

At step 504, the lock manager 301A modifies, adds, or deletes lock state of the lock associated with the data container, at the local memory of node 102A according to the instruction. At step 506, the lock manager 301A determines whether the lock needs to be mirrored. In one embodiment, a lock will need to be mirrored if it has a Persistent Open feature. If the lock is not to be mirrored at step 506, then the process moves to step 512 that is described below.

If the lock is to be mirrored, then at step 508, the lock manager 301A determines if local or partner mirroring is needed. If local or partner mirroring is not needed, then the process moves to step 512. The storage cluster may need to perform local or partner mirroring in various scenarios. For example, the storage cluster can perform partner mirroring during a giveback process, which is discussed herein in the detailed description of FIG. 7 and its related paragraphs. Or the storage cluster can conduct a local mirroring during an aggregate relocation operation, which is discussed in details in the FIG. 8 and it related paragraphs.

If local or partner mirroring is needed, then the necessary lock state information for mirroring is extracted from an original lock data structure at step 510. The necessary lock state information depends on the lock type. For example, for a Shared Lock, the necessary lock state information may include client identifier information, reconnect key, data container identifier, volume identifier where the data container is stored or any other information. The reconnect key is typically provided to a client for a Persistent Open lock. The client uses the reconnect key when node 102A becomes unavailable and the client needs to use the same lock either when node 102A becomes available again or if node 102B takes over.

At step 511, node 402A determines if partner node 102B (node II) is available. In one embodiment, node 102A can determine this by sending a status message to node 102b using connection 116. If the partner 102b is unavailable, then the process moves to step 512.

If partner 102B is available, then at step 514, the lock manager 301A determines if the lock state has already been mirrored. If the lock state has already been mirrored, then at step 516, lock manager 301A determines if the mirroring process succeeds. This can be determined by receiving a status message from node 102b. If the mirroring succeeded, then the process moves to step 512. If the mirroring did not succeed, then at step 528, the process ends and optionally an error message can be sent to client 114A.

If the mirroring has not occurred at step 514, then at step 518, the lock state information (e.g. metadata in fields' 305A-305F) is sent by node 102A to node 102B. The lock state information includes minimal information that can be used by node 102b to generate a lock data structure for a lock, if node 102A becomes unavailable. At step 520, node 102B creates or updates the lock information at mirrored lock data structure 403A. Node 102B then sends a status message to node 102A at step 522 indicating node 102B has the up-to-date lock information.

At step 512, the lock state is committed to storage device 402A of node 102A from memory. Thereafter at step 524 determines if mirroring of any lock states is needed at node 102A. This step can happen when node 102B gives back control to node 102A, after node 102A became unavailable and node 102B took over. Local mirroring can be needed when locks are created at a partner node or are changed at a partner node. If local mirroring is not needed, then the process ends at step 528. If local mirroring is needed, then at step 526, node 102A creates the lock state information at lock data structure 303A.

As shown in FIG. 4A, a node can include both N-modules and D-modules. N-module is a network element responsible for connecting to client computing systems (clients) over a network connection. A D-module is responsible for controlling one or more storage devices. In one embodiment, any N-module in a cluster can communicate with any D-module in the same cluster. An N-module and D-module do not need be on the same node in order to communicate with each other.

During events such as takeover and aggregate migration, lock data structures are mirrored from a first node to its partner node. The mirrored lock data structures can be used to reconstruct original lock data structures on the partner node. By keeping the mirrored lock data structures, the cluster preserves the Persistent Open and the associate lock state when there is failure during such an event.

In one embodiment, for instance, a client connects to an N-module of a first node to access the files (or other types of data containers, such as logic units and blocks) stored in a D-module of a second node. If the D-module became unavailable before notifying the client, then from the perspective of the client there is no disruption that has occurred yet.

The cluster terminates the connection with the client. The client can then choose to reconnect with the cluster for additional read or write operations on the file. In one embodiment, first an N-module receives a request to operate on a file permitted by a lock from a client through an existing connection between the client and the node including the N-module. The N-module determines a D-module which is responsible for the storage including the file, and forwards the data operation request and an identification of the lock to the D-module. The D-module, which is responsible for maintaining lock data structures, then checks the lock state to determine whether the lock state is currently valid. In one embodiment, the D-module can establish a flag mechanism for that purpose, which is disclosed in details in the following paragraphs. If the lock state is valid, the D-module executes the data operation request and sends back confirmation to the N-module. If the lock state is invalid, the D-module sends back a unique error code to the N-module. In one embodiment, the unique error code can indicate to close the connection. Upon receiving the unique error code from the D-module, the N-module sends a connection termination message to the client to terminate the existing connection with the client.

Figure 6:
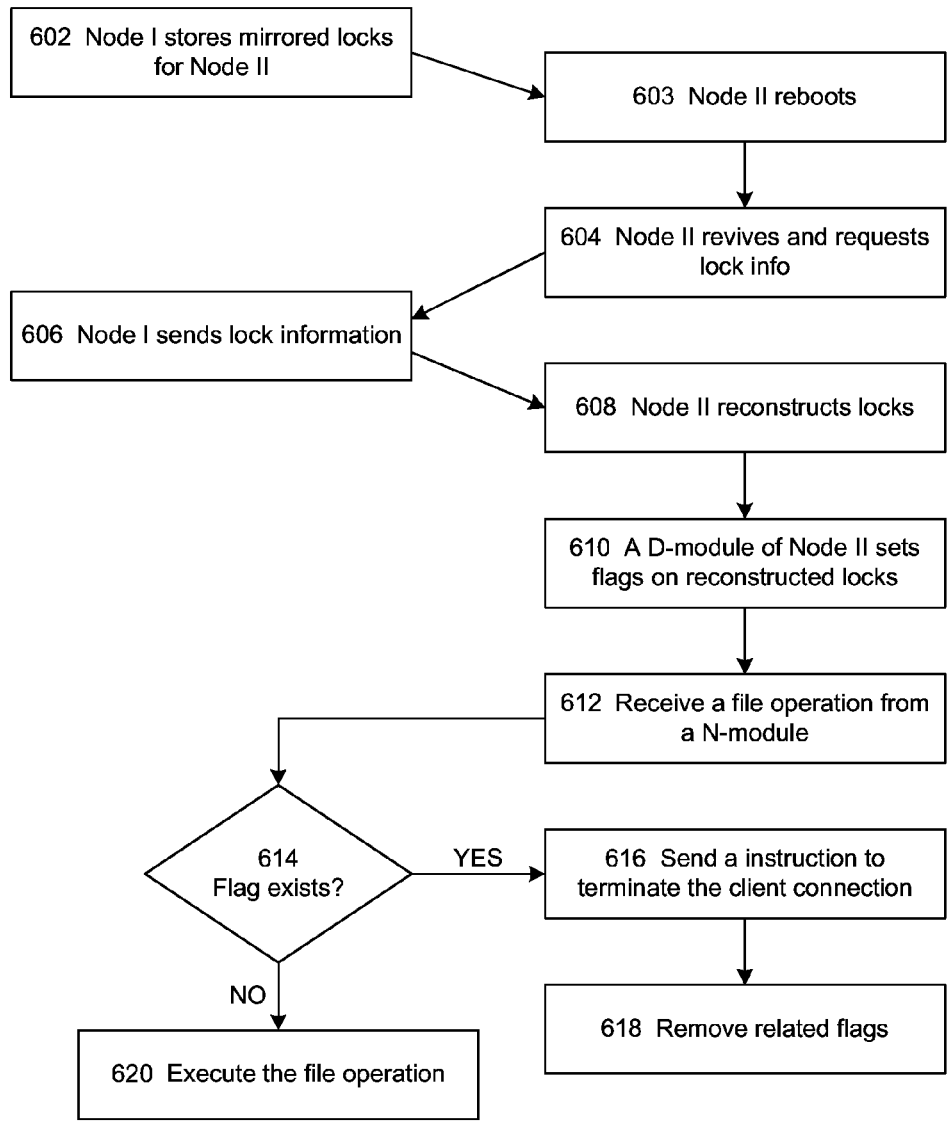
FIG. 6 shows an example of a takeover and reconnection process for a high-availability cluster.

For example, a cluster can use the reconnection mechanism discussed above after a takeover even to ensure data integrity. FIG. 6 shows a takeover and reconnection process 600 that involves exchanging lock state information between two HA nodes (node I and node II), according to one embodiment. At the start of process 600, at step 602, node I is fully operational responding to client 114 requests, having valid lock states for itself as well as partner node II. At step 603, as an example, node II is rebooting and hence the lock states for node I are unavailable from node II memory. Node II may be rebooting for any reason, such as a communication failure. When node II is unavailable, partner node I takes over responsibility for providing services in relation to the storage volumes of node II.

At step 604, node II revives and sends a message to node I indicating that node II wants to resume control of its storage and requesting that node I send lock state information for its storage. At step 606, as part of a giveback procedure, node I sends the lock state information related to the locks for the storage to be given back to node II. The lock state information that is sent to node II can include the locks that are owned by node I and the locks that were owned by node II before the rebooting at step 603.

At step 608, node II reconstructs lock data structures for its storage based on the transferred lock state information. At step 610, a D-module of node II sets flags on the reconstructed lock data structures. The flags indicate that the lock data structures associated with the flags have been reconstructed and the related client connections have not been closed or reset yet.

At step 612, the D-module of node II receives a data operation permitted by a lock from a client relayed by an N-module. In one embodiment, the relaying N-module belongs to the node I. In another embodiment, the relaying D-module belongs to another node with which the client connects. In some embodiments, the D-module of node II does not receive a data operation. Instead, the D-module of node II receives other types of communications associated with the lock at step 612. At step 614, the D-module of node II checks whether there is an existing flag set on the corresponding lock data structure. If there is no existing flag on the corresponding lock data structure, the D-module proceeds to execute the data operation (620). If there is an existing flag set on the corresponding lock data structure, the D-module of node II sends an instruction to the N-module to terminate the client connection. Upon receiving the instruction, the N-module sends a request to the client to terminate the connection between the client and the N-module (616). Accordingly, the client is notified that the connection is terminated and that the cached writes have not been committed to the file unless the client reestablishes a reconnection with the cluster. In some embodiments, the client can reestablish the connection by sending a reconnect request. At step 618, the D-module of node II clears the flag when the D-module receives a reconnect request from the client. If the client reestablishes the connection and sends further data operations under the lock, the D-module will execute the data operations because the associated flag has been clears.

In one embodiment, the data operation request can be an unlock request for giving up the data container access privilege controlled by the lock. In such a case, the D-module will continue to execute the request, therefore invalidate or remove the lock (and clears the flag as well), and sends a reconnection request to the client. The client can still choose to reconnect with the cluster and request new locks for further data container operations.

In another embodiment, the D-module waits for a predetermined time period for reconnect request from the client. If the D-module receives no reconnect request from the client after the predetermined time period, the D-module can remove the corresponding lock data structure.

In one embodiment, at least some of the lock data structures that a D-module maintains can be OpLocks. An OpLock (opportunistic lock) provides a synchronization mechanism for caching. A client can request an OpLock to keep a file open to continuously read from or write to that file. Having the OpLock granted, the client can assume exclusive read/write right to that file so that the client can cache all changes to the file before committing it to D-module storing the file. The write performance is improved by the mechanism because fewer network transactions are needed to commit the cached writes to the file. In one embodiment, the node can revoke the exclusive OpLock by sending a message to the client. Accordingly as a cleanup procedure of revoking the OpLock, the client flushes all remaining cached changes to that file.

Figure 7:
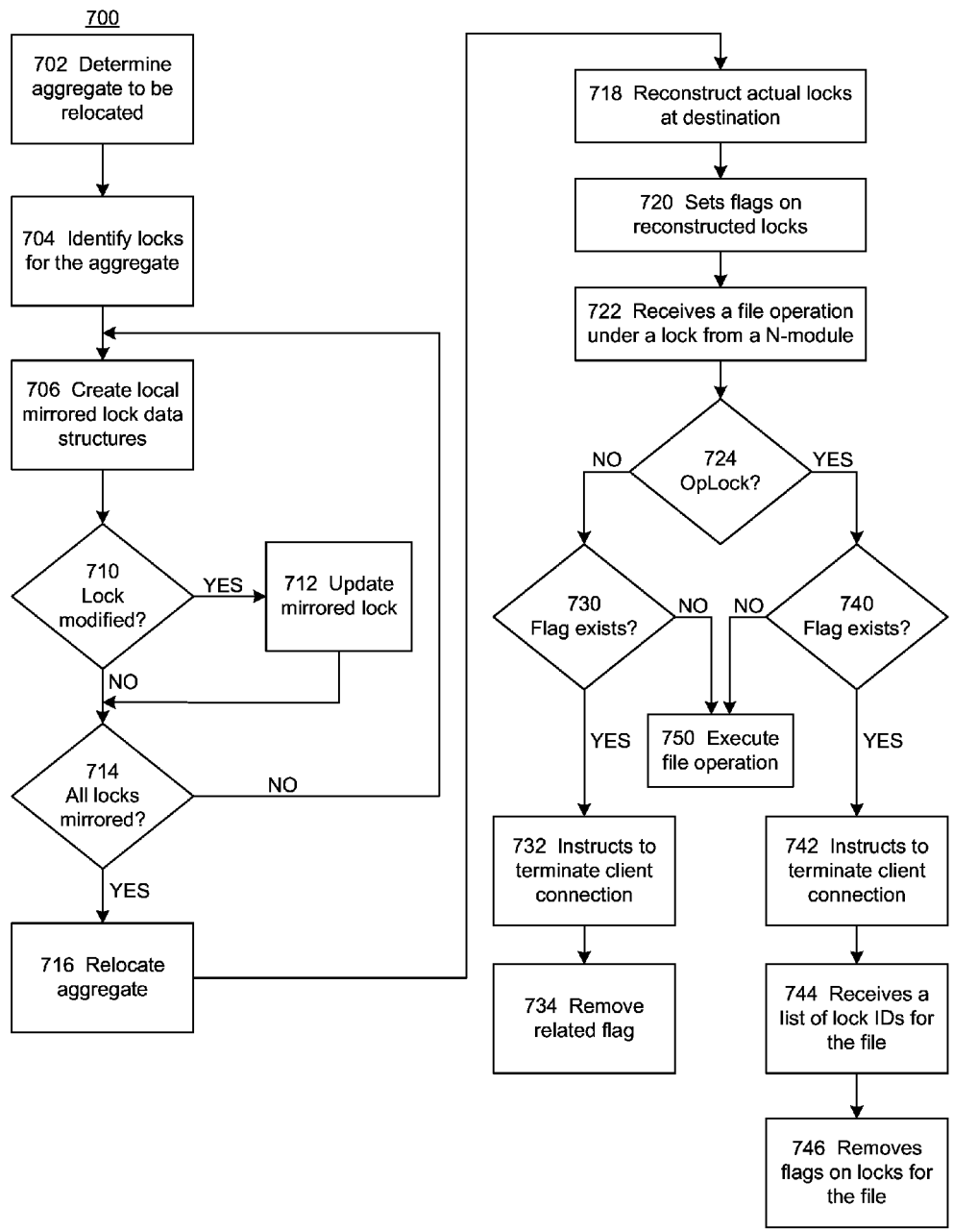
FIG. 7 shows an example of a process flow for an aggregate relocation and client reconnection process for a high-availability cluster.

Similarly, the cluster can use the above mechanism to ensure data integrity during aggregate relocation. FIG. 7 shows a process flow for an aggregate relocation and reconnection process. A cluster can perform aggregate relocation when the cluster attempts to balance load within the cluster, or when the cluster replaces or updates some of the nodes of the cluster. At step 702, the source node first determines an aggregate to be relocated to a partner node (also referred to as destination node). Next, the source node identifies all of the locks for the aggregate to be relocated (704) and creates mirrored lock data structures for these identified locks in the memory of the source node (706). The process is called local lock-sync. If a data access operation from a client modifies a lock that is identified for aggregate relocation (710), the source node will update the mirrored lock data structure in its local memory accordingly (712).

The aggregate will not be allowed to relocate until the local lock sync between the mirrored lock data structure and the original lock data structure for the aggregate completes. Once this local lock-sync completes (714), the source node can relocate the aggregate to the destination node (716). Since both the source node and the destination node are within the same high-availability pair, during the aggregate relocation the destination node takes over the control of the aggregate. When the destination node takes the control of the aggregate, both the destination node and the source node already have mirrored lock data structure for the relocated aggregate from which the original lock data structures can be reconstructed in case the destination node fails. Therefore, at the end of aggregate relocation process, the destination node assumes control of the related aggregate and reconstructs original lock data structure for the aggregate (718); while the source node maintains a synchronized mirrored lock data structure for the same aggregate. Thus, the HA pair retains the non-disruption capability; at this point, the HA pair can have either node crashed and still retain lock state for non-disruptive operation. During or after the aggregate relocation process, the HA pair continues to maintain the non-disruption capability.

At step 720, a D-module of the destination node sets flags on reconstructed lock data structures. The flags indicate that the lock data structures have been reconstructed and the associated client connections have not been closed or reset yet. At step 722, the D-module of the destination node receives a data operation permitted by a lock from a client relayed by an N-module another node. At step 724, the D-module checks whether the lock is an OpLock.

If the lock is not an OpLock, the D-module checks whether there is an existing flag set on the corresponding lock data structure (730). If there is no flag set on the corresponding lock data structure, D-module proceeds to execute the data operation (750). If there is a flag set on the corresponding lock data structure, the D-module sends an instruction to terminate the client connection (732). In one embodiment, the N-module replays the instruction to the client. Accordingly, the client is notified that the connection is terminated and that the cached writes have not been committed to the file unless the client reestablishes the connection. In some embodiments, the client can re-establish the connection by sending a reconnect request to the cluster. At step 734, the D-module clears the corresponding flag when the D-module receives a reconnect request from the client. If the client reestablishes the connection and sends further data operations under the lock, the D-module will execute the data operations.

If the lock is an OpLock, the D-module checks whether there is a flag set on the corresponding lock data structure (740). If there is no flag set on the corresponding lock data structure, D-module proceeds to execute the data operation (750). If there is a flag set on the corresponding lock data structure, the D-module sends an instruction to the N-module to terminate the client connection (742). Further at step 744, the D-module receives a list of lock identifications (e.g. lock IDs) from an N-module. Each lock identification represents a different lock on the same file from the same client. Upon receiving the instruction, the N-module sends a request to the client to terminate the connection between the client and the N-module. Accordingly, the client is notified that the connection is terminated and that the cached writes have not been committed to the file. In some embodiments, the client can re-establish the connection and continue the operations under the privilege of the OpLock. At step 734, the D-module clears the flags on the locks identified by the received lock identifications when the D-module receives a reconnect request from the client. Accordingly the D-module recalls the OpLock and executes further data operations from the client.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:

reconstructing, at a storage node of a storage cluster, a lock data structure representing a lock for a data container, based on a mirrored lock data structure representing the lock, the mirrored lock data structure being stored at a different storage node, the storage node and the different storage node together forming a high-availability pair within the storage cluster;

setting a flag associated with the lock data structure, wherein the flag indicates that the lock data structure has been recently constructed;

receiving, at the storage node, a data operation request permitted by the lock from a client to operate on the data container subsequent to reconstructing the lock data structure;

determining, by the storage node, that the received data operation request involves the data container for which the lock data structure has been reconstructed by determining whether the flag associated with the lock data structure exists; and instructing, by the storage node, the client to terminate the connection between the storage cluster and the client in response to determining that the lock data structure representing the lock has been reconstructed based on the flag indicating that the lock data structure has been recently reconstructed;

clearing the flag associated with the lock data structure in response to a reconnect request from the client received subsequent to terminating the connection.

2. The method of claim 1, wherein the data operation request is relayed by an additional storage node, wherein terminating the connection in response to determining that the lock data structure representing the lock has been reconstructed comprises instructing, by the storage node, the additional storage node to terminate the connection between the storage cluster and the client if the lock data structure representing the lock has been reconstructed.

3. The method of claim 1, further comprising:
executing, at the storage node subsequent to clearing the flag, the data operation request in response to determining that the flag does not indicate that the lock data structure has been recently reconstructed.

4. The method of claim 1, further comprising:
receiving, at the storage node, a list of identifications of locks for the data container; and
clearing flags associated with lock data structures representing the locks for the data container based on the list.

5. The method of claim 1, further comprising:
reviving the storage node;
receiving, from a partner node of the storage node, metadata of the mirrored lock data structure representing the lock for the data container; and
taking over, from the partner node, a storage in which the data container is stored.

6. The method of claim 1, further comprising:
receiving, from an additional storage node, metadata of the mirrored lock data structure representing the lock for the data container; and
relocating a storage aggregate from the additional storage node to the storage node, wherein the storage aggregate includes the data container.

7. The method of claim 1, further comprising:
receiving, at the storage node, an additional data operation request permitted by the lock from the client to operate on the data container, wherein the additional data operation request is received after the client has reestablished the connection with the storage cluster; and
executing, at the storage node, the additional data operation request in response to determining that the flag does not indicate that the lock data structure has been recently reconstructed.

8. The method of claim 1, wherein the connection between the storage cluster and the client is also terminated based on the data operation request being an unlock request;
wherein the method further comprises removing the lock data structure for the lock on the data container according to the unlock request.

9. The method of claim 1, wherein the method further comprises:
removing the lock data structure representing the lock for the data container if the storage node receives no reconnect request from the client after a predetermined time period.

10. A storage node for use within a storage cluster, the storage node comprising:
a memory containing a machine-readable medium that comprises machine-executable code having stored thereon instructions for performing a method; and
a processor communicatively coupled to the memory, the processor configured to execute the machine-executable code to cause the processor to:
reconstruct a lock data structure representing a lock for a data container, based on a mirrored lock data structure representing the lock, the mirrored lock data structure being stored at a different storage node, the storage node and the different storage node together forming a high-availability pair within the storage cluster,
set a flag associated with the lock data structure, wherein the flag indicates that the lock data stricture has been recently constructed;
receive, subsequent to reconstructing the lock data structure, a data operation request permitted by the lock from a client to operate on the data container,
determine that the received data operation request involves the data container for which the lock data structure has been reconstructed by determining whether the flag associated with the lock data structure exists, and
instruct the client to terminate a connection between the storage cluster and the client in response to determining that the lock data structure representing the lock has been reconstructed based on the flag indicating that the lock data structure has been recently reconstructed.

11. The method of claim 1, further comprising:
rebooting the storage node, wherein an additional storage node takes over responsibility for providing data request services in relation to the storage node during the rebooting of the storage node;
receiving, at the storage node from the additional storage node, metadata of the mirrored lock data structure representing the lock for the data container; and
taking back, from the additional storage node, responsibility for providing the data request services in relation to the storage node.

12. The method of claim 2, wherein the additional storage node is separate from the different storage node.

13. A non-transitory machine-readable medium having stored thereon instructions for performing a method, the instructions comprising machine-executable code that, when executed by one or more machines, causes the one or more machines to perform operations comprising:
reconstructing, at a storage node of a storage cluster, a lock data structure representing a lock for a data container, based on a mirrored lock data structure representing the lock, the mirrored lock data structure being stored at a different storage node, the storage node and the different storage node together forming a high-availability pair within the storage cluster;
setting a flag associated with the lock data structure, wherein the flag indicates that the lock data structure has been recently constructed;
receiving a data operation request permitted by the lock from a client to operate on the data container subsequent to reconstructing the lock data structure;
determining that the received data operation request involves the data container for which the lock data structure has been reconstructed by determining whether the flag associated with the lock data structure exists; and
instructing the client to terminate a connection between the storage cluster and the client in response to determining that the lock data structure representing the lock has been reconstructed.

14. The non-transitory machine-readable medium of claim 13, wherein the machine-executable code, when executed by the one or more machines, causes the one or more machines to perform additional operations comprising:
   executing, at the storage node subsequent to clearing the flag, the data operation request in response to determining that the flag does not indicate that the lock data structure has been recently reconstructed.

* * * * *